(12) United States Patent
Guerin

(10) Patent No.: US 9,770,763 B2
(45) Date of Patent: Sep. 26, 2017

(54) HANDHELD MACHINING DEVICE, PARTICULARLY FOR DRILLING

(75) Inventor: Sylvain Guerin, Seclin (FR)

(73) Assignee: ADVANCED ELECTRICAL TOOLS, Seclin (FR)

(*) Notice: Subject to any disclaimer, the term of this patent is extended or adjusted under 35 U.S.C. 154(b) by 252 days.

(21) Appl. No.: 13/977,762

(22) PCT Filed: Dec. 29, 2011

(86) PCT No.: PCT/FR2011/000681
§ 371 (c)(1),
(2), (4) Date: Jul. 1, 2013

(87) PCT Pub. No.: WO2012/089936
PCT Pub. Date: Jul. 5, 2012

(65) Prior Publication Data
US 2013/0287509 A1    Oct. 31, 2013

(30) Foreign Application Priority Data

Dec. 30, 2010 (FR) ..................................... 10 05188

(51) Int. Cl.
*B23B 45/02* (2006.01)
*B23B 45/00* (2006.01)
(Continued)

(52) U.S. Cl.
CPC ............ *B23B 45/008* (2013.01); *B23B 45/02* (2013.01); *B23Q 5/225* (2013.01); *B23Q 5/326* (2013.01);
(Continued)

(58) Field of Classification Search
CPC ............... Y10T 408/45; Y10T 408/455; Y10T 408/5628; Y10T 408/56275;
(Continued)

(56) References Cited

U.S. PATENT DOCUMENTS 3,119,210 A * 1/1964 Doeden .................... B23Q 5/06
409/231
3,128,988 A * 4/1964 Mandroian .............. A61C 1/05
384/110
(Continued)

FOREIGN PATENT DOCUMENTS

EP    1785227 A1 *  5/2007
EP    2 108 478     10/2009
(Continued)

OTHER PUBLICATIONS

International Search Report dated Apr. 17, 2012, corresponding to PCT/FR2011/000681.

*Primary Examiner* — Daniel Howell
*Assistant Examiner* — Yasir Diab
(74) *Attorney, Agent, or Firm* — Young & Thompson

(57) ABSTRACT

A handheld machining device (1), particularly for drilling, having a mechanism includes: a first mounting (20), on which a tool holder (2), and a motor (3, 4) arranged to rotate the tool holder (2), are mounted; a second mounting (30); and an element (40) for translatably guiding, between the first mounting (20) and the second mounting (30), a linear actuator (5) enabling the first mounting (20) to be spaced apart from the second mounting (30), and the first mounting (20) to be brought toward the second mounting (30). The motor (3, 4) is electric, and the rotor (4) of the first motor (3, 4) is directly mounted onto the tool holder (2) and is rigidly connected thereto.

15 Claims, 5 Drawing Sheets

(51) Int. Cl.
*B23Q 5/22* (2006.01)
*B23Q 5/36* (2006.01)
*B23Q 5/40* (2006.01)
*B23Q 5/32* (2006.01)

(52) U.S. Cl.
CPC .................. *B23Q 5/32* (2013.01); *B23Q 5/36* (2013.01); *B23Q 5/40* (2013.01); *Y10T 408/45* (2015.01); *Y10T 408/675* (2015.01); *Y10T 408/6793* (2015.01)

(58) Field of Classification Search
CPC ............. Y10T 408/5647; Y10T 408/65; Y10T 408/675; Y10T 408/68; B23Q 5/28; B23Q 5/32; B23Q 5/326; B23Q 5/36; B23Q 5/40; B23B 45/02
USPC .... 408/57, 59, 102, 101, 111, 124, 129, 138
See application file for complete search history.

(56) References Cited

U.S. PATENT DOCUMENTS

| | | | | |
|---|---|---|---|---|
| 4,008,774 | A * | 2/1977 | Milano | B23Q 5/06 173/153 |
| 4,209,721 | A * | 6/1980 | Feldle et al. | 310/67 R |
| 4,688,970 | A * | 8/1987 | Eckman | 408/9 |
| 4,697,964 | A * | 10/1987 | Daiko | B23Q 15/12 408/11 |
| 4,752,161 | A * | 6/1988 | Hill | B23Q 5/06 408/127 |
| 4,958,967 | A * | 9/1990 | Adachi | 409/185 |
| 5,123,789 | A * | 6/1992 | Ohtani et al. | 408/1 R |
| 5,755,537 | A * | 5/1998 | Lubbering | 408/3 |
| 6,092,965 | A * | 7/2000 | Mark et al. | 408/124 |
| 6,280,124 | B1 * | 8/2001 | Ammann | 408/129 |
| 8,167,518 | B2 | 5/2012 | Mathis et al. | |
| 2006/0269369 | A1 | 11/2006 | Fritsche | |
| 2008/0260485 | A1 * | 10/2008 | Jaillon | B23B 35/005 409/232 |
| 2009/0257836 | A1 * | 10/2009 | Mathis et al. | 408/1 R |
| 2009/0269153 | A1 * | 10/2009 | Schevers | B23Q 5/225 408/130 |
| 2009/0326537 | A1 * | 12/2009 | Anderson | A61B 17/1624 606/80 |

FOREIGN PATENT DOCUMENTS

| | | |
|---|---|---|
| GB | 783 820 | 10/1957 |
| WO | 2009/128757 | 10/2009 |

* cited by examiner

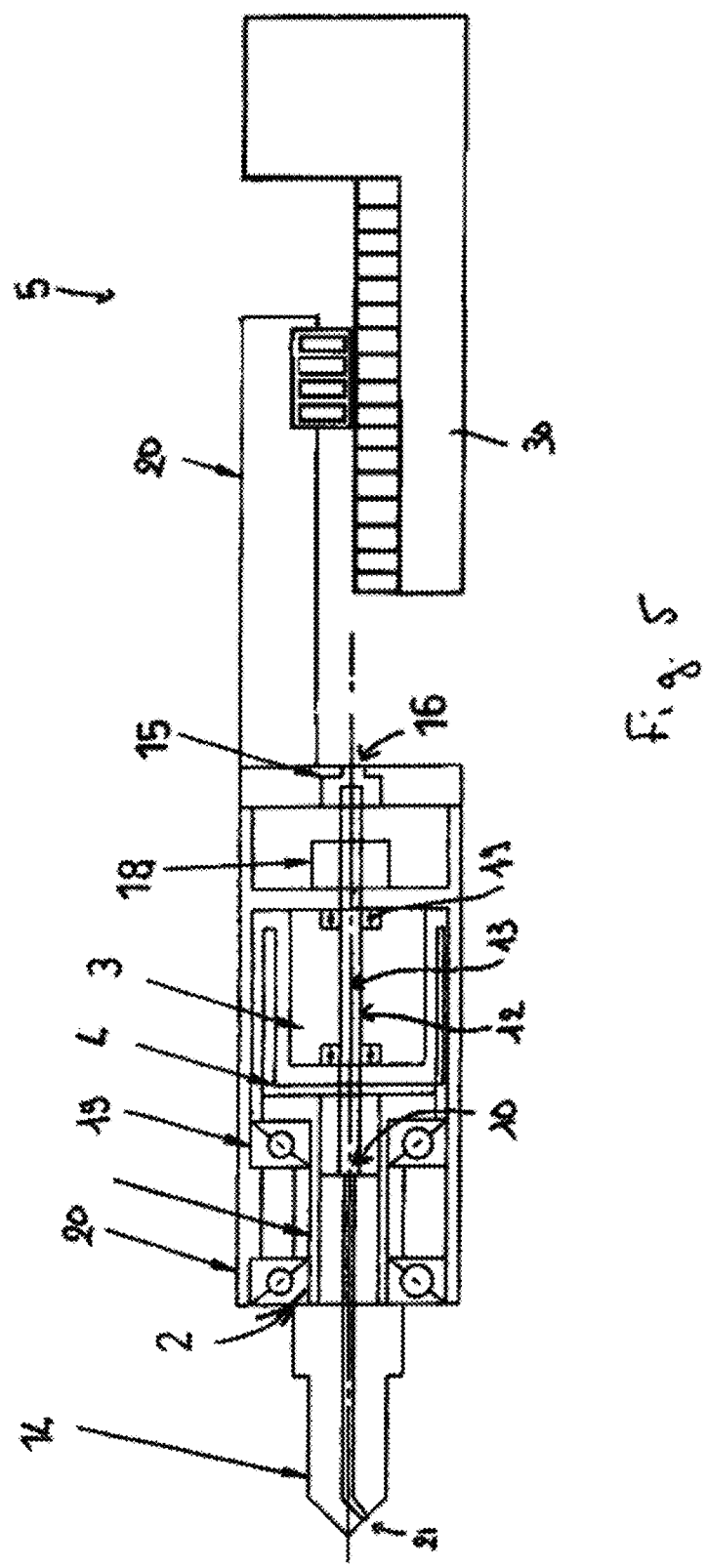

HANDHELD MACHINING DEVICE, PARTICULARLY FOR DRILLING

FIELD OF THE INVENTION

The invention relates to a handheld machining device, more particularly for drilling.

BACKGROUND OF THE INVENTION

In the field of handheld drilling tools, particular in aeronautics, handheld drilling tools are known that make it possible not only to rotate the cutting tool, but also to move the cutting tool forwards or backwards, in a controlled manner, thanks to a linear actuator of said handheld tool.

It is known in prior art for example documents EP-2.108.478 or WO-2009/128757 of such handheld tools. In the devices of these two documents, a first motor makes it possible, by the intermediary of a screw/nut system to control the forward movement or backward movement of the cutting tool, while a second motor makes it possible to transmit a spin torque to the cutting tool, by the intermediary of a spline shaft transmission. In the devices of these two documents, the first motor and the second motor are fixed in relation to one another. The second motor, transmitting the spin torque to the tool, is rigidly connected to the case of the mechanism.

It is also known from the state of the art document US-2006/0269369 a handheld machining device that combines, on the one hand a pneumatic motor in order to rotate a cutting tool, and on the other hand a linear actuator comprising a ball screw and an electric motor, of the stepping type enabling the simultaneous displacement in translation of the unit formed by the pneumatic motor and cutting tool, forwards and backwards. In the device of this document, the pneumatic motor and the electric motor are displaced in translation, in relation to one another, during the forward movement or backward movement of the cutting tool.

In the device of this document US-2006/0269369, the electric motor, of the stepping type, is coupled to an angular encoder which produces a signal that represents the position of the linear actuator. This signal is used by control electronics allowing the control of the electric motor of the linear actuator. These electronics are a separate element and distinct from the handheld device, connected in particular to the electric motor of the tool by means of a flexible electric cable. Using a pneumatic motor requires in order to rotate the cutting tool at low speeds (less than 8000 rpm) the provision of a reducer between the tool and the output of the motor. Such a device does not enable any control of the rotation of the cutting tool.

SUMMARY OF INVENTION

The purpose of this invention is to propose a handheld machining device making it possible to obtain cutting precisions down to the micron, improved performance as to known prior art.

Other purposes and advantages of this invention shall appear in the following description, which is provided only for the purposes of information and which does not have for purpose to limit it.

The invention relates to a handheld machining device, in particular for drilling having a mechanism comprising:
  a first mounting which carries:
    a tool holder,
    a motor arranged to rotate the tool holder,
  a second mounting and means for translatably guiding between the first mounting and said second mounting,
  a linear actuator enabling the first mounting to be spaced apart from second mounting and the first mounting to be brought toward said second mounting.

According to the invention, said motor is an electric motor and the rotor of the motor is directly mounted onto the tool holder, rigidly connected to said tool holder.

According to optional characteristics, taken individually or in combination:
  the rotor of the motor is exterior to the stator of said motor;
  said motor is said first motor and said linear actuator comprises a ball screw system and a second motor;
  the second motor is an electric motor and the rotor of the second motor is directly mounted onto the screw of the linear actuator, rigidly connected to said screw.
  the second mounting carries said second motor, the stator of said second motor being integral in translation with said second mounting, the nut of the ball screw system being integral in translation with said first mounting, or alternatively:
  the first mounting carries said second motor, the stator of said second motor being integral in translation with said first mounting, the nut of the ball screw system being integral in translation with said second mounting;
  the rotor of said second motor is exterior to the stator of said second motor;
  the axis of rotation of the tool holder and the axis of rotation of the screw of the ball screw system are parallel and confounded;
  the axis of rotation of the tool holder and the axis of rotation of the screw of the ball screw system are parallel and not confounded, said unit formed by the tool holder and first motor being positioned juxtaposed laterally to said linear actuator.
  the device has an angular encoder targeting the rotation of the screw of the ball screw system, as well as power and control electronics for controlling said first motor and said second motor having for input the signal emitted by said angular encoder;
  the device has, in addition to the angular encoder targeting the rotation of the screw, said first angular encoder, a second angular encoder targeting the rotation of said tool holder, said power and control electronics for controlling said first motor and said second motor having for input, in addition to the signal emitted by the first angular encoder, the signal emitted by said second angular encoder;
  said mechanism is integrated into a case in particular provided with a handle, said power and control electronics being interior and integrated into said case of said handheld device;
  the tool holder has a rotating shaft integral with the rotor motor said rotating shaft having a duct for a fluid intended to lubricate a cutting tool, as well as a rotating seal providing the seal between one end of the rotating shaft and an inlet port for the fluid;
  said linear actuator is comprised of a linear motor.

BRIEF DESCRIPTION OF THE DRAWINGS

The invention shall be better understood when reading the following description accompanied by the annexed figures:

FIG. 5 diagrammatically shows the mechanism of the handheld tool in accordance with the invention, according an alternative embodiment with a linear actuator comprised of a linear motor.

DETAILED DESCRIPTION OF THE INVENTION

Figure 1:
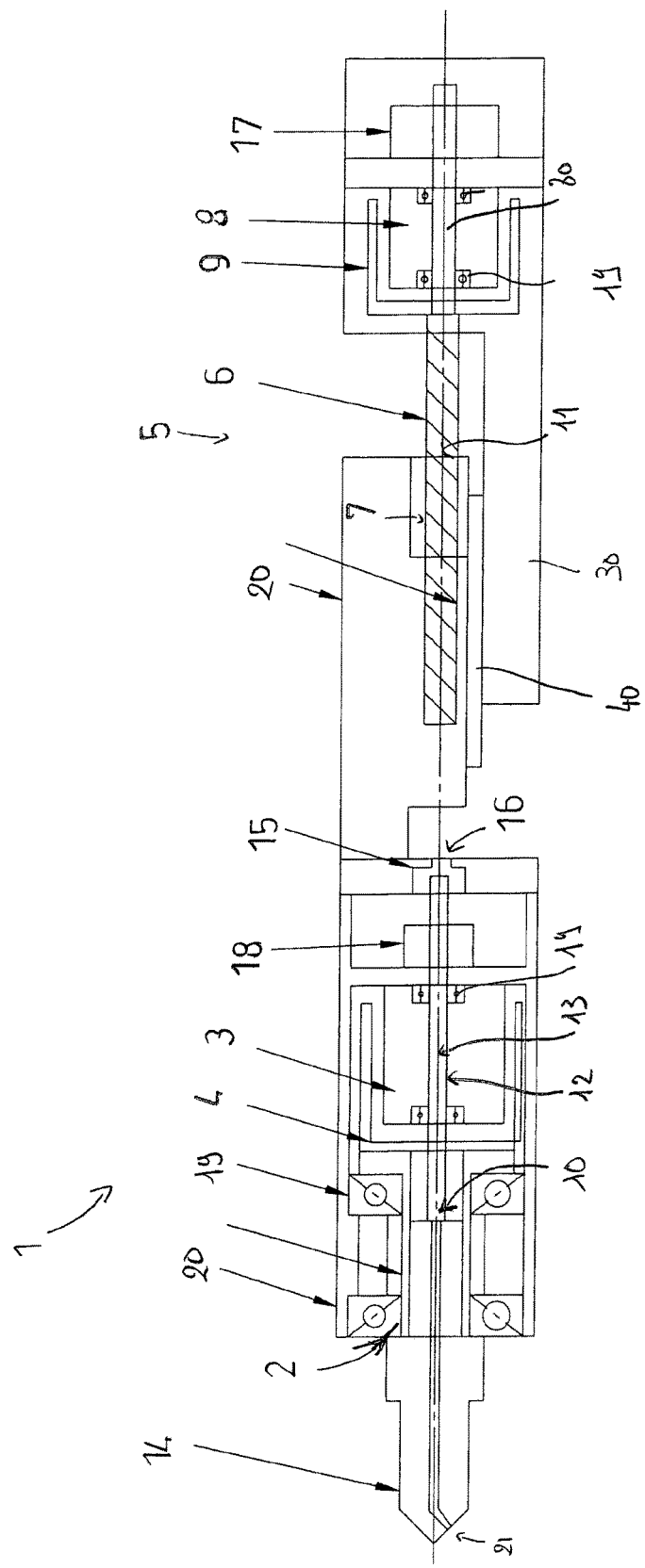
FIG. 1 diagrammatically shows the mechanism of the handheld tool in accordance with the invention, according to an embodiment.

Also, the invention relates to a handheld machining device 1, in particular for drilling, having a mechanism comprising:
- a first mounting 20 which carries:
- a tool holder 2,
- a motor 3, 4 arranged to rotate the tool holder 2,
- a second mounting 30 and means 40 for translatably guiding between the first mounting 20 and said second mounting 30,
- a linear actuator 5 enabling the first mounting 20 to be spaced apart from said second mounting 30 and the first mounting 20 to be brought toward said second mounting 30.

According to the invention, the motor 3, 4 is an electric motor and the rotor 4 of the motor 3, 4 is directly mounted onto the tool holder 2, rigidly connected to said tool holder 2.

The direct mounting of the rotor 4 onto the tool holder 2 makes it possible to eliminate the presence of a reduction gear between these two elements 2, 4, making it possible not only to reduce the encumbrance of the device 1 but also to avoid the presence of a gap inherent to the gears of a reducer.

The rotor 4 of the motor 3, 4 can be exterior to the stator 3 of said motor 3, 4. The use of an external rotor motor for the motor 3, 4 makes it possible to limit the number of bearings 19 for the simultaneous guiding in rotation of the rotor 4.

According to the invention, the linear actuator 5 makes it possible as such to displace in translation at least the unit formed by the tool holder 2 and motor 3, 4. The motor 3, 4 makes it possible to rotate the tool holder 2, of which the axis of rotation is parallel to the axis of displacement of the linear actuator 5.

Figure 4:
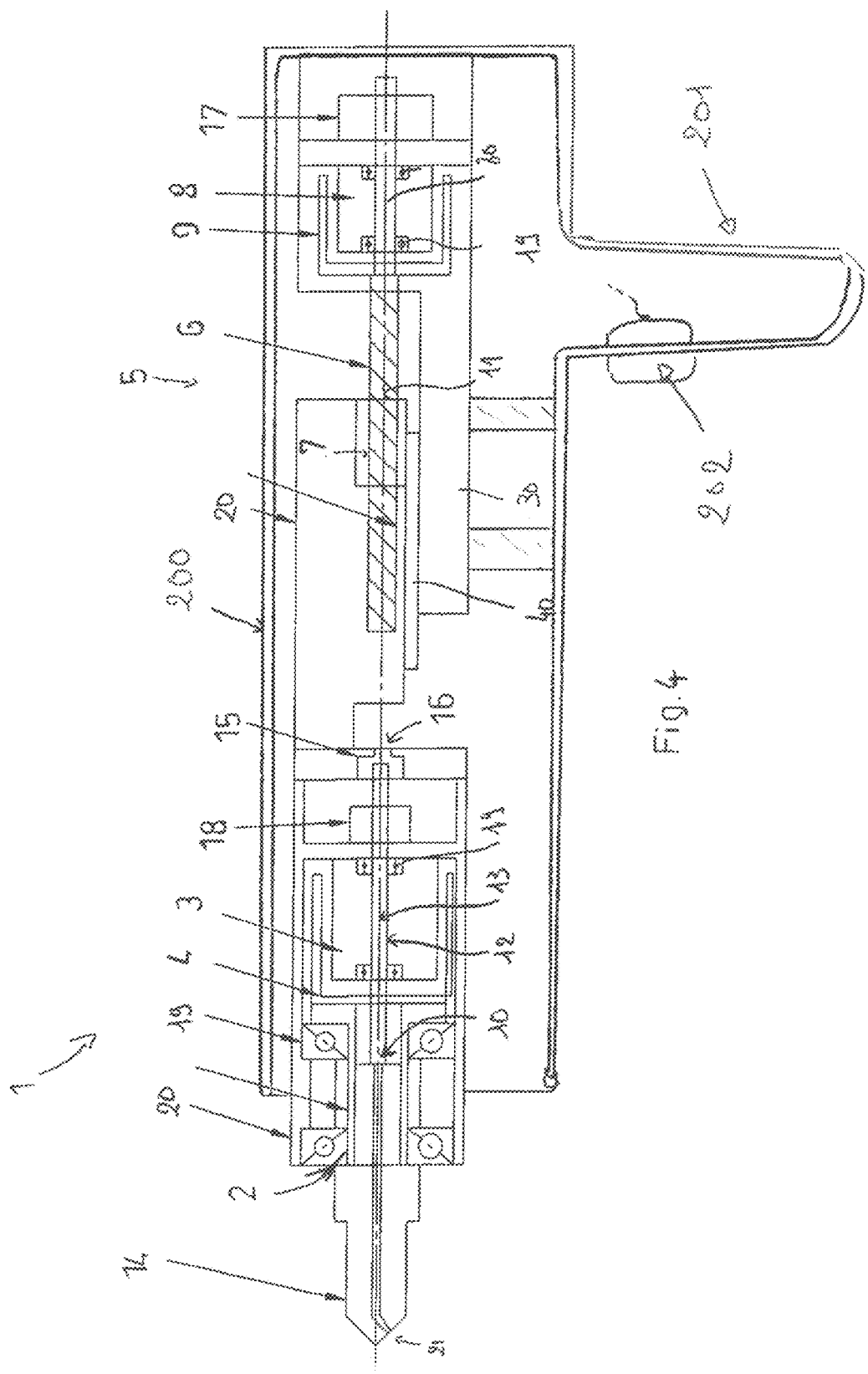
FIG. 4 schematically illustrates a handle provided with a control trigger for the handheld tool.

Of course, this mechanism can be integrated into a case 200 in particular made of plastic, and in particular provided with one or several handles(s) (not shown) allowing an operator to manipulate the handheld device. One of the handles 201 can in particular be provided with a control trigger 202 (FIG. 4) in a manner known per se, in order to actuate the machining.

According to an embodiment, said motor 3, 4 is said first motor 3, 4 and said linear actuator 5 comprises a ball screw system 6, 7 and a second motor 8, 9. According to the example embodiment shown in FIG. 1, the second motor 8, 9 can be an electric motor and the rotor 9 of the second motor 8, 9 is directly mounted onto the screw 6 of the linear actuator 5, rigidly connected to said screw 6.

The direct mounting of the rotor 9 of the second motor 8, 9 onto the screw 6 makes it possible to avoid the presence of a reducer between these two elements making it possible to limit the encumbrance of the device, but also to avoid the presence of a gap inherent to the gears of a reducer.

According to an embodiment shown, the rotor 9 of said second motor 8, 9 can be exterior to the stator 8 of said second motor.

The use of an external rotor motor for the second motor 8, 9 makes it possible to limit the number of bearings 19 for the simultaneous guiding in rotation of the rotor 9 and of the screw 6.

The motors, utilised for the first motor 3, 4 and/or the second motor 8, 9 can be high-performance brushless electric motors and of low voltage (less than 48 volts). These motors have very advantageous power/weight performance (greater than 5 W/g) and use magnet technologies with a high Curie point (about 200°) and winding wires of which the insulators can withstand temperatures of 180° C. Such motors are in particular marketed by the Company Scorpion Power System Ltd.

Figure 2:
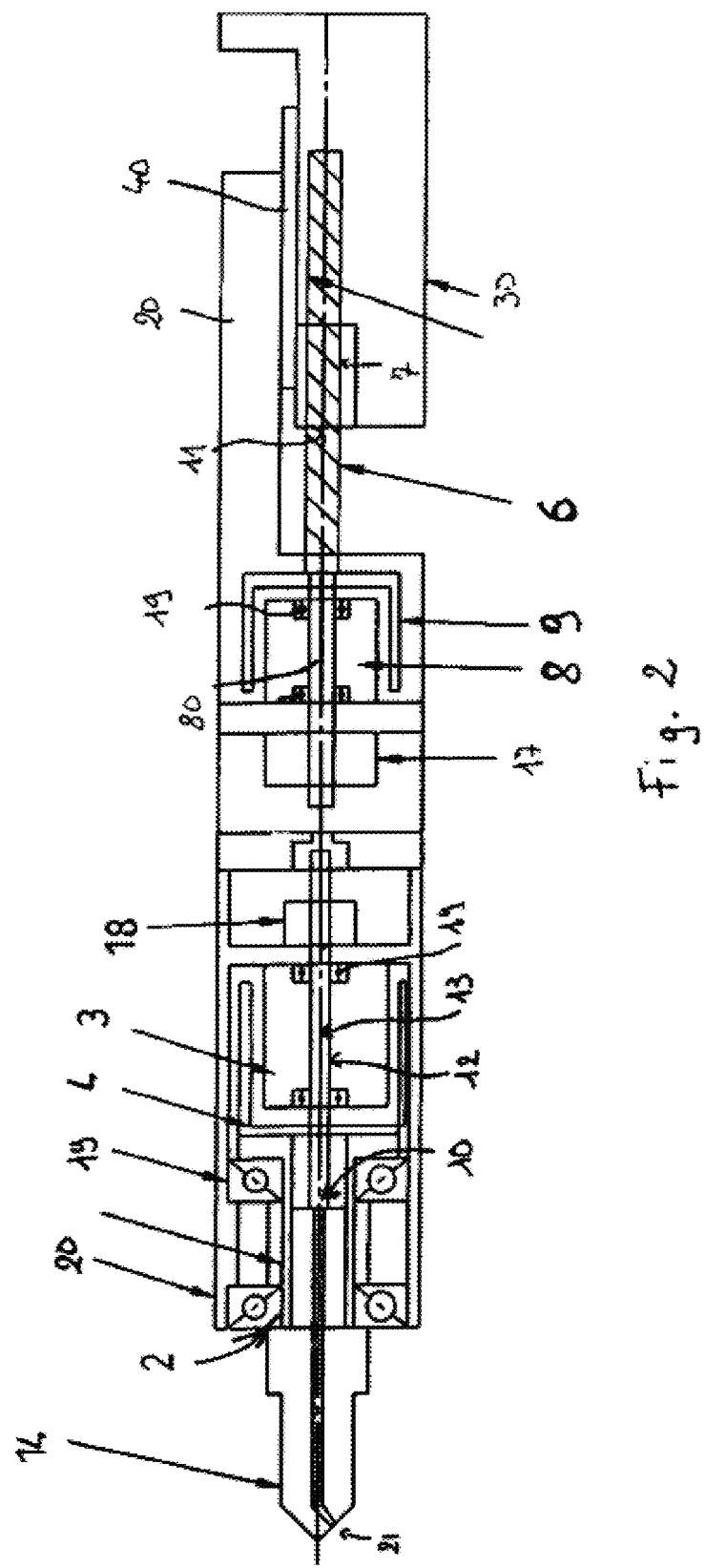
FIG. 2 diagrammatically shows the mechanism of the handheld tool in accordance with the invention, according an alternative embodiment with the carrying of the second motor by the first mounting.

According to an embodiment shown in FIG. 1, the second mounting 30 carries said second motor 8, 9, the stator 9 of said second motor 8, 9 being integral in translation with said second mounting 30, the nut 7 of the ball screw system 6, 7 being integral in translation with said first mounting 20. Alternatively according to an embodiment shown in FIG. 2 the first mounting 20 carries said second motor 8, 9, the stator 9 of said second motor 8, 9 with integral in translation with said first mounting 20, the nut 7 of the ball screw system 6, 7 being integral in translation with said second mounting 30.

According to an embodiment shown in FIG. 1, the axis of rotation 10 of the tool holder of the axis of rotation 11 of the screw 6 of the ball screw system 6, 7 are parallel and confounded. Alternatively, according to an embodiment not shown, of less encumbrance, the axis of rotation of the tool holder 2 and the axis of rotation of the screw 6 of the ball screw system 6, 7 can be parallel and not confounded, said unit formed by the tool holder 2 and first motor 3, 4 being positioned juxtaposed laterally to said linear actuator 5.

According to an embodiment, shown in FIG. 1, the tool holder 2 has a rotating shaft 12 integral with the rotor 4 of the first motor 3, 4, said rotating shaft having a duct 13 for a fluid intended to lubricate the cutting tool 14, as well as a rotating seal 15 providing the seal between one end of the rotating shaft 12 and an inlet port 16 for the fluid.

According to this example, the cutting tool 14 can be provided with an internal duct intended to channel the fluid from the duct 13 of the rotating shaft to the cutting edge of the cutting tool 14.

Figure 3:
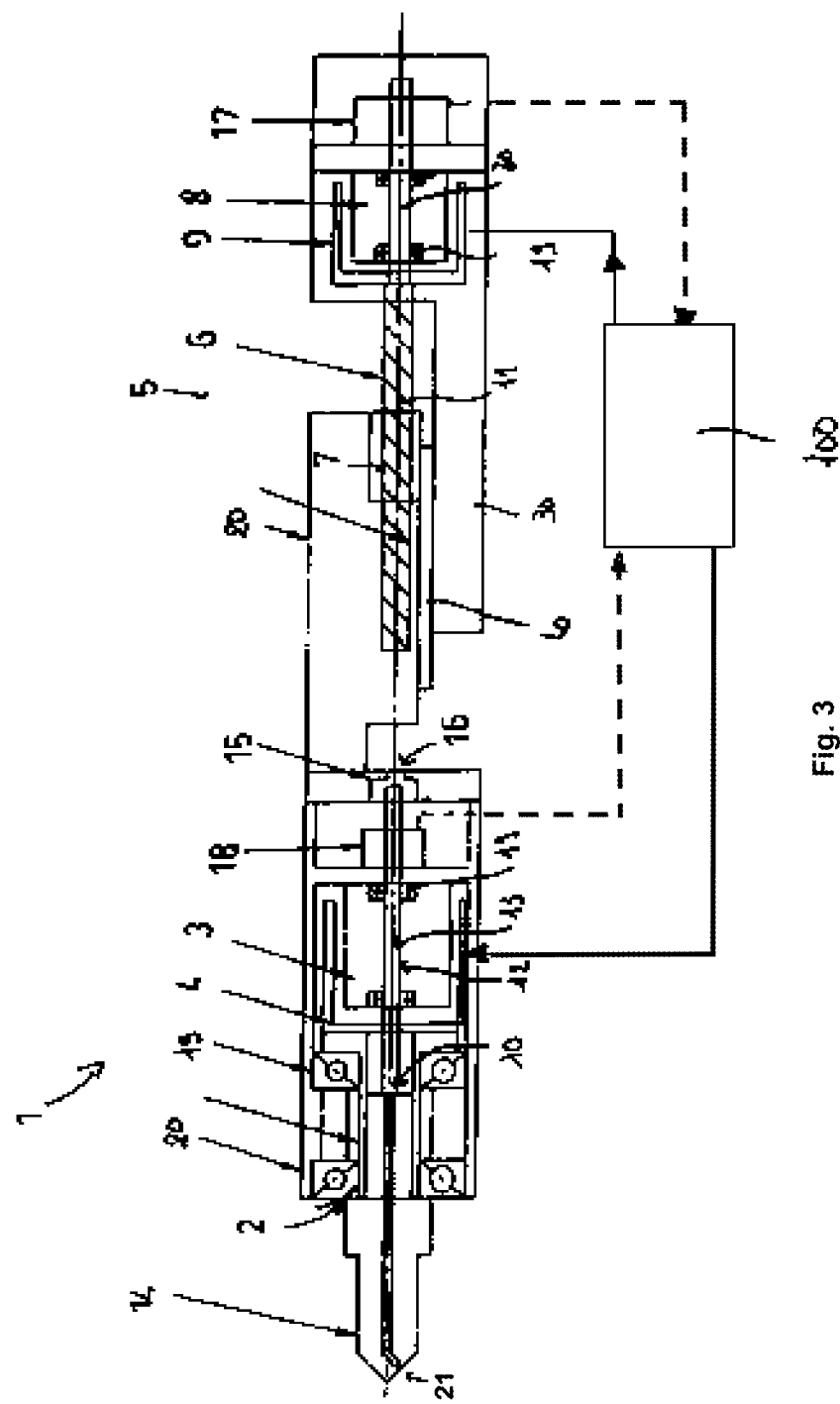
FIG. 3 schematically illustrates the power and control electronics for controlling the first motor and second motor of the handheld tool.

The device 1 can have an angular encoder 17 targeting the rotation of the screw 6 of the ball screw system 6, 7 as well as power and control electronics 100 (shown in FIG. 3) for the control of said first motor 3, 4 and of the second motor 8, 9 comprising for input at least the signal emitted by said angular encoder 17. Advantageously, these electronics can be integrated into the case of the handheld tool, interior to this case.

The handheld tool can have, in addition to the angular encoder 17 targeting the rotation of the screw 6, said first angular encoder, a second angular encoder 18 targeting the rotation of the tool holder 2.

The power and control electronics for controlling the first motor 3, 4 and the second motor 8, 9 has then for inputs, in addition to the signal emitted by the first angular encoder 17, the signal emitted by said second angular encoder 18.

The embodiment shown in FIG. 1 shall now be described in detail.

The mechanism of the handheld machining device comprises a first hollow mounting 20, this mounting interiorly receives a rotating shaft 12 guided in rotation thanks to two ball bearings 19, provided between said shaft and the mounting 20. This shaft 12 is rigidly integral, on the one hand, with a tool holder 2 to which is rigidly connected a cutting tool 14, and on the other hand rigidly integral with a rotor 4 of said first motor 3, 4. The stator 3 of the first motor 3, 4 is rigidly integral with the mounting 20. An angular encoder 18 makes it possible to target the rotation of the shaft 12.

This rotating shaft 12 is hollow and constitutes a duct 13 for a fluid intended to lubricate the cutting tool 14. One of the ends of the duct 13 is associated to a rotating seal 15 which makes it possible to provide the seal between the end of the shaft 12 and an inlet port 16 of the mounting 20. The duct of the shaft 12 of the tool holder 2 is extended interiorly into the cutting tool 14, the duct 13 opening on the cutting edge of the tool 14.

The second motor 8, 9 of the linear actuator 5 is provided on a second mounting 30. The stator 8 of the second motor 8, 9 is interior to the rotor 9. The stator 8 is integral with the second mounting 30. The rotor 9, external to the stator 8, is mounted rotating guided in rotation thanks to a ball bearing 19 between the shaft of the motor.

The rotor 9 of the second motor 8, 9 is rigidly integral with the screw 6 of the ball screw system 6. The nut 7 of the ball screw system 6, 7 is integral with the first mounting 20. A sliding connection (said means for translatably guiding 40) with axis parallel to the axis of the ball screw 6 is provided between the first mounting 20 and the second mounting 30. This sliding connection makes it possible to guide in translation the unit comprising the first mounting 20, the first motor 3, 4 and the cutting tool 14 in relation to the unit comprising the second mounting 30 and the second motor 8, 9. An angular encoder 17 makes it possible to target the rotation of the rotating shaft of said second motor 8, 9.

According to an embodiment (shown in FIG. 5) the linear actuator 5 comprised according to the example of the ball screw system 6, 7 and said second motor 8, 9 can be replaced with a linear actuator comprised of a linear motor.

According to this embodiment, the device can have a linear encoder targeting the displacement of the first mounting in relation to second mounting, as well as power and control electronics 100 (shown in FIG. 3) for controlling, on the one hand, the motor arranged to rotate the tool holder and, on the other hand, the controlling of said linear motor. These electronics comprise for input at least the signal emitted by the linear encoder.

Advantageously, these electronics can be integrated into the case of the handheld device receiving the mechanism, interior to this case.

The handheld device can have, in addition to the linear encoder targeting the displacement of the first mounting in relation to second mounting, an angular encoder targeting the rotation of the tool holder. The power and control electronics then have for input, in addition to the signal emitted by the linear encoder, the signal emitted by the angular encoder.

Naturally, other embodiments could have been considered by those skilled in the art without however leaving the scope of the invention defined by the claims hereinafter.

The invention claimed is:

1. A handheld machining device (1) for drilling having a mechanism comprising:
   a first mounting (20) which carries:
     a tool holder (2),
     a first motor (3, 4) arranged to rotate the tool holder (2),
   a second mounting (30) and a sliding connection between the first mounting (20) and said second mounting (30),
   a linear actuator (5) enabling the first mounting (20) to be spaced apart from the said second mounting (30) and the first mounting (20) to be brought toward said second mounting (30),
   wherein the linear actuator (5) comprises a ball screw system (6, 7) having a screw (6) and nut (7) and a second motor (8,9) having a stator (8) and rotor (9),
   wherein the first motor (3, 4) is an electric motor having a stator (3) and a rotor (4), the rotor (4) being exterior to the stator (3), and the rotor (4) of the motor (3, 4) is directly mounted onto the tool holder (2), rigidly integral with said tool holder (2), configured so that:
     the rotation ratio between tool holder and rotor is 1/1 and
     the tool holder and rotor are the same rigid assembly such as that there is no misalignment between tool holder rotation axis and rotor axis,
   wherein the axis of rotation of the tool holder (2) and the axis of rotation of the screw (6) of the ball screw system (6, 7) are parallel and not coaxial said unit formed by tool holder (2) and first motor (3, 4) being positioned juxtaposed laterally to said linear actuator (5), and
   wherein the device (1) is configured to be handheld.

2. The device according to claim 1, wherein the second motor is an electric motor and wherein the rotor (9) of the second motor (8, 9) is directly mounted onto the screw (6) of the linear actuator (5), rigidly integral with said screw (6).

3. The device according to claim 1, wherein the second mounting (30) carries said second motor (8, 9), the stator (9) of said second motor (8, 9) being integral in translation with said second mounting (30), the nut (7) of the ball screw system (6, 7) being integral in translation with said first mounting (20).

4. The device according to claim 1, wherein the first mounting (20) carries said second motor (8, 9), the stator (9) of said second motor (8, 9) being integral in translation with said first mounting (20), the nut (7) of the ball screw system (6, 7) being integral in translation with said second mounting (30).

5. The device according to claim 1, wherein the rotor (9) of said second motor (8, 9) is exterior to the stator (8) of said second motor.

6. The device according to claim 1, having an angular encoder (17) targeting the rotation of the screw (6) of the ball screw system (6, 7), as well as power and control electronics for controlling said first motor (3, 4) and said second motor (8, 9) having for input the signal emitted by said angular encoder (17).

7. The device according to claim 6, having, in addition to the angular encoder (17) targeting the rotation of the screw (6), said first angular encoder, a second angular encoder (18) targeting the rotation of said tool holder (2), said power and control electronics for controlling said first motor (3, 4) and second motor (8, 9) having for input, in addition to the signal emitted by the first angular encoder (17), the signal emitted by said second angular encoder (18).

8. The device according to claim 6, wherein said mechanism is integrated into a case in particular provided with a handle, said power and control electronics being interior and integrated into said case of said handheld device.

9. The device according to claim 1, the tool holder has a rotating shaft (12) integral with the rotor (4) of the first motor (3, 4), said rotating shaft (12) having a duct (13) for a fluid intended to lubricate a cutting tool (14), as well as a rotating seal (15) providing the seal between one end of the rotating shaft (12) and an inlet port (16) for the fluid.

10. The device according to claim 2, wherein the second mounting (30) carries said second motor (8, 9), the stator (9) of said second motor (8, 9) being integral in translation with said second mounting (30), the nut (7) of the ball screw system (6, 7) being integral in translation with said first mounting (20).

11. The device according to claim 2 wherein the first mounting (20) carries said second motor (8, 9), the stator (9) of said second motor (8, 9) being integral in translation with said first mounting (20), the nut (7) of the ball screw system (6, 7) being integral in translation with said second mounting (30).

12. The device according to claim 7, wherein said mechanism is integrated into a case provided with a handle, said power and control electronics being interior and integrated into said case of said handheld device.

13. The device according to claim 1, wherein said first motor (3,4) is a brushless electric motor and of a voltage that is less than 48 volts.

14. The device according to claim 3, wherein said first motor (3,4) and second motor (8,9) are a brushless electric motors and of a voltage that is less than 48 volts.

15. The device according to claim 4, wherein said first motor (3,4) and second motor (8,9) are a brushless electric motors and of a voltage that is less than 48 volts.

* * * * *